(12) United States Patent
Bertrem et al.

(10) Patent No.: US 10,234,055 B2
(45) Date of Patent: Mar. 19, 2019

(54) DIRECTIONAL CONTROL VALVE LOCKING DEVICE

(71) Applicants: Jeffrey Allen Bertrem, Tulsa, OK (US); Kyle Wayne Rarick, Broken Arrow, OK (US)

(72) Inventors: Jeffrey Allen Bertrem, Tulsa, OK (US); Kyle Wayne Rarick, Broken Arrow, OK (US)

( * ) Notice: Subject to any disclaimer, the term of this patent is extended or adjusted under 35 U.S.C. 154(b) by 80 days.

(21) Appl. No.: 15/478,163

(22) Filed: Apr. 3, 2017

(65) Prior Publication Data

US 2017/0284560 A1 Oct. 5, 2017

Related U.S. Application Data

(60) Provisional application No. 62/317,174, filed on Apr. 1, 2016.

(51) Int. Cl.
*F16K 35/06* (2006.01)
*F16K 31/60* (2006.01)

(52) U.S. Cl.
CPC .......... *F16K 35/06* (2013.01); *F16K 31/602* (2013.01)

(58) Field of Classification Search
CPC .............................. F16K 35/06; F16K 31/602
USPC ........................................................ 137/385
See application file for complete search history.

(56) References Cited

U.S. PATENT DOCUMENTS

| | | | |
|---|---|---|---|
| 3,976,095 A | 8/1976 | Koch | |
| 4,208,033 A | 6/1980 | Kesterman | |
| 4,498,320 A | 2/1985 | Mullis | |
| 4,534,379 A * | 8/1985 | Burge | F16K 35/10 137/385 |
| 4,844,115 A * | 7/1989 | Bowers | F16K 1/221 137/240 |
| 5,244,008 A * | 9/1993 | Bauer | F16K 35/04 137/385 |
| 5,323,805 A | 6/1994 | Scaramucci | |
| 5,365,759 A | 11/1994 | Bonomi | |
| 5,370,148 A * | 12/1994 | Shafer | F16K 1/22 137/15.25 |
| 5,482,251 A * | 1/1996 | Roberts | F16K 5/0647 251/288 |
| 5,579,804 A * | 12/1996 | Roberts | F16K 35/06 137/385 |

(Continued)

*Primary Examiner* — Kevin F Murphy
(74) *Attorney, Agent, or Firm* — AJ D. Martinez; Latham, Wagner, Steele & Lehman, P.C.

(57) ABSTRACT

An inexpensive, simple, effective, and easily implementable locking device for use with directional control valves that allows for the valve to be securely locked in a desired operating position, thereby preventing unauthorized, inadvertent or otherwise undesired manipulation of the valve minimizing potentially damaging or injurious conditions. The locking device has an adjustable locking plate and a fixed locking bracket, both of which are adapted to the valve using the valve's existing components for ease of installation and adaptation and so the normal operation of the valve is not impeded. The adjustable locking plate is mounted to the valve over the valve stem. The fixed locking bracket mounts to the valve body using the valve's existing bolts and nuts. Locking holes in the adjustable locking plate and fixed locking bracket line up and allow for the valve to be securely locked in a desired operating position with a locking member.

11 Claims, 7 Drawing Sheets

(56) References Cited

U.S. PATENT DOCUMENTS

| | | | |
|---|---|---|---|
| 7,114,698 B2 | 10/2006 | Espinoza | |
| 8,261,930 B2 * | 9/2012 | Satterfield | B60P 3/221 220/562 |
| 9,010,721 B2 * | 4/2015 | Hoots | F16K 1/2007 251/109 |
| 2006/0169696 A1 * | 8/2006 | Taylor | B65D 55/16 220/326 |
| 2009/0152484 A1 | 6/2009 | LeBlanc | |

* cited by examiner

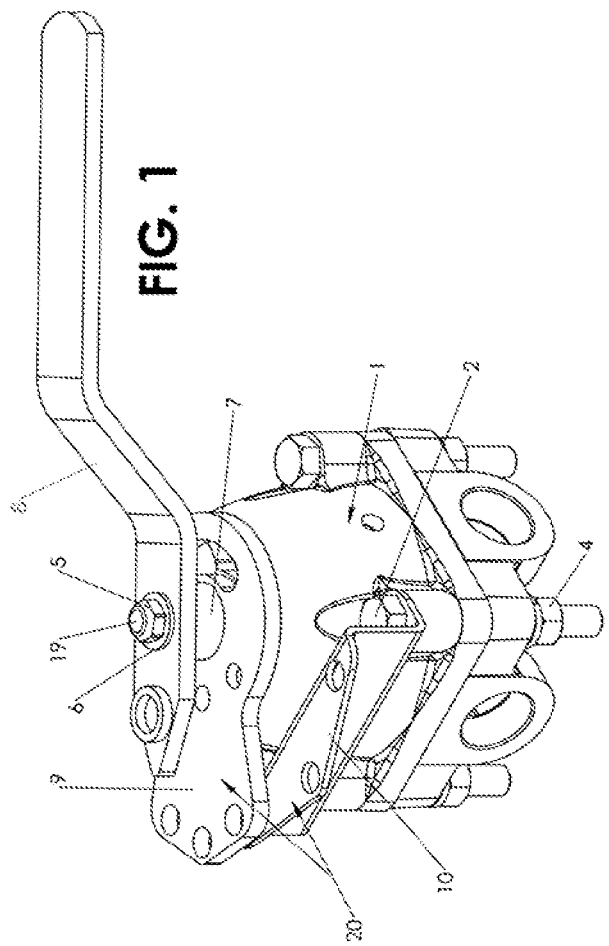

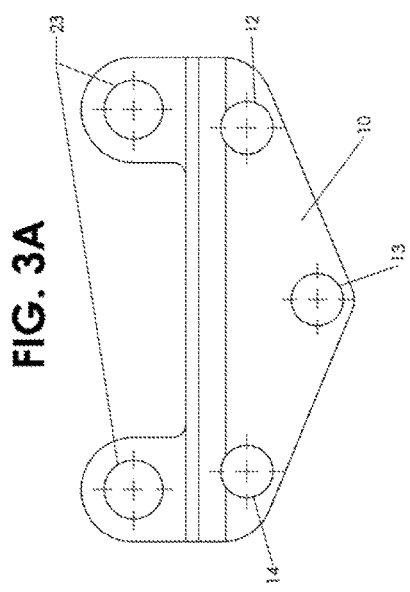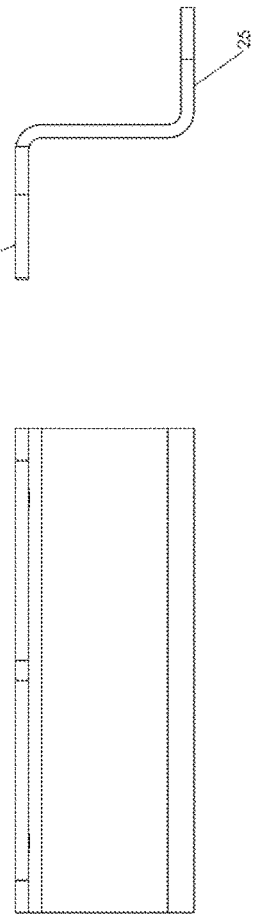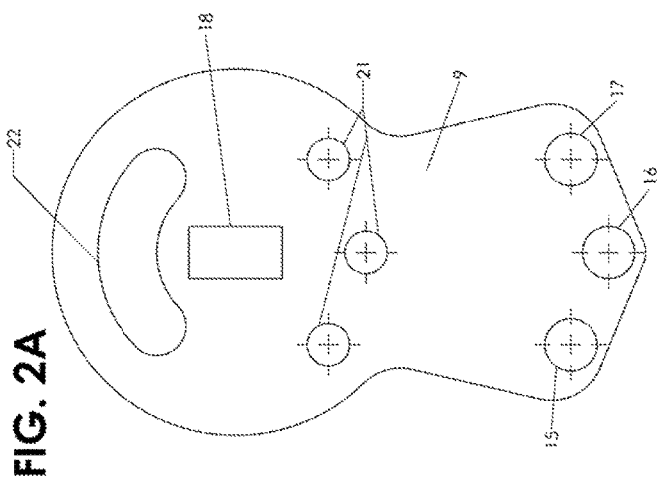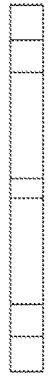

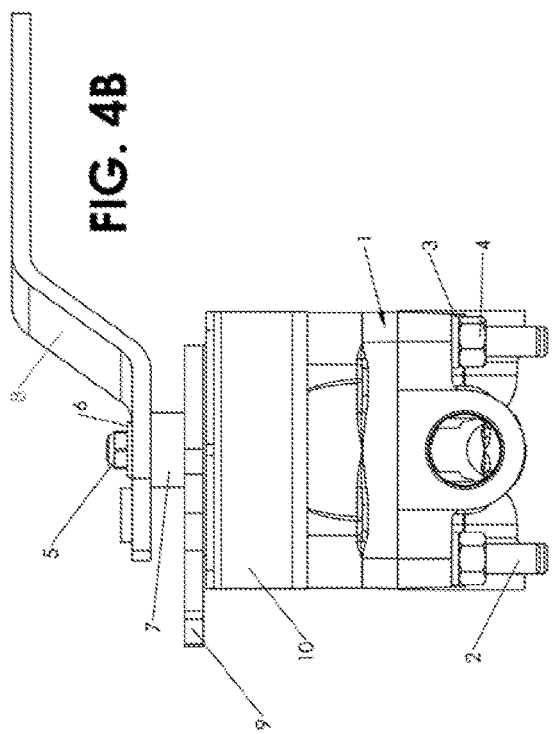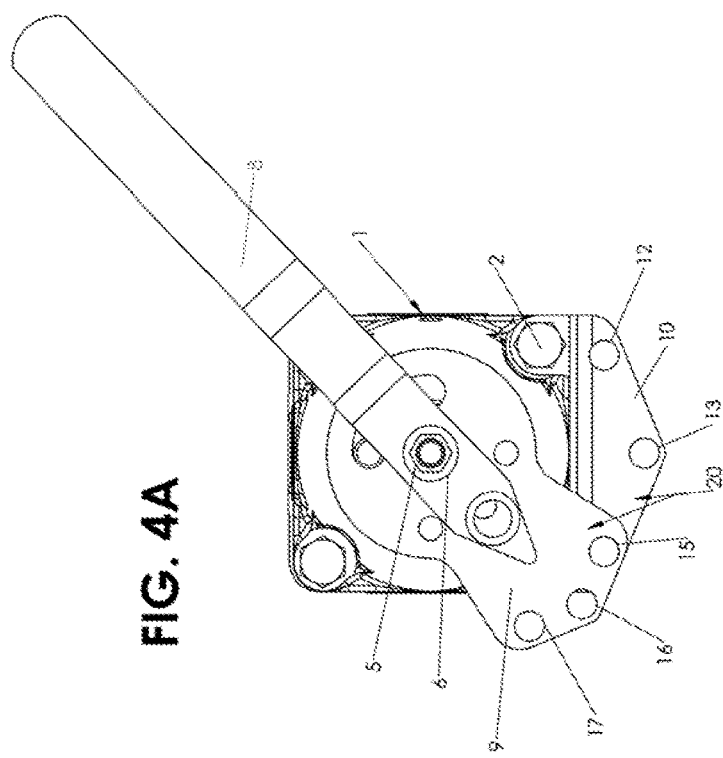

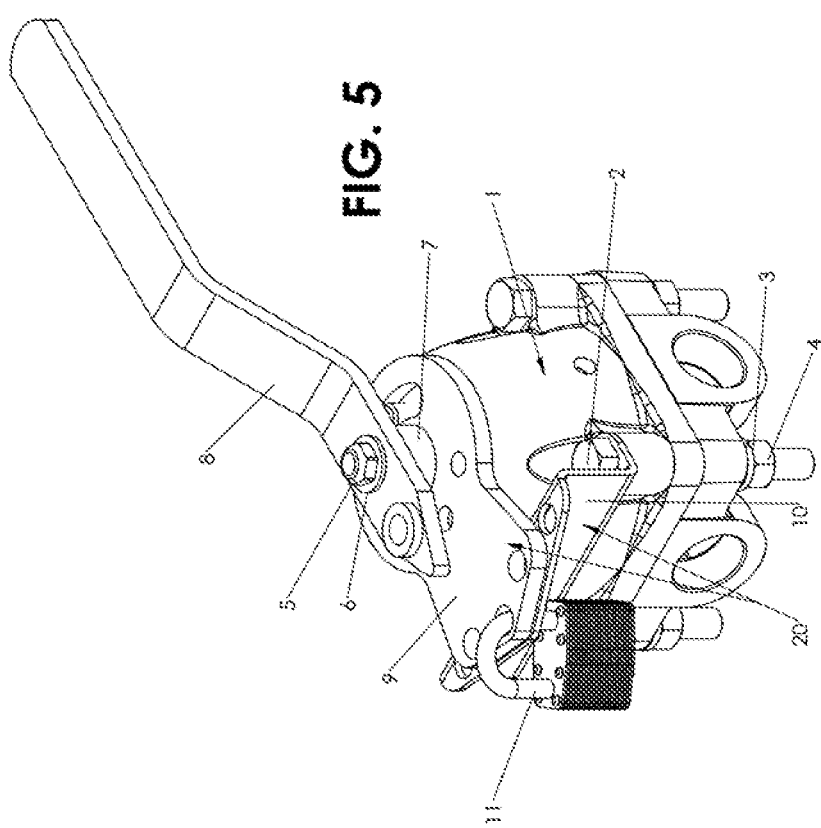

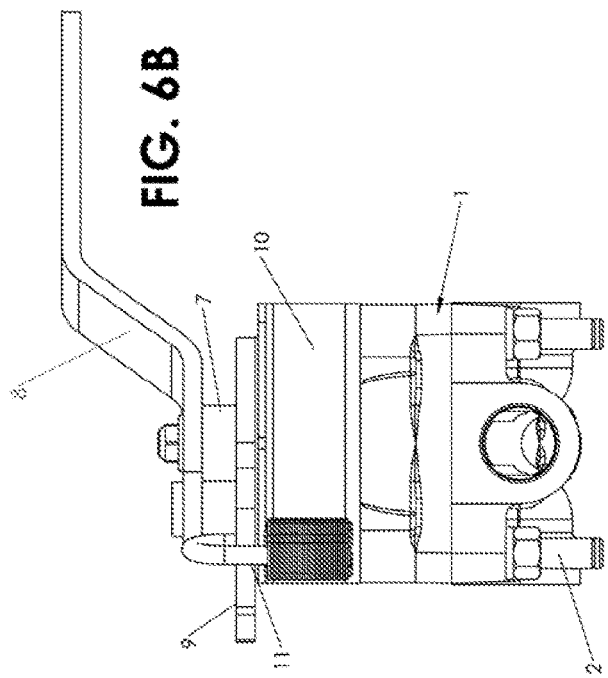
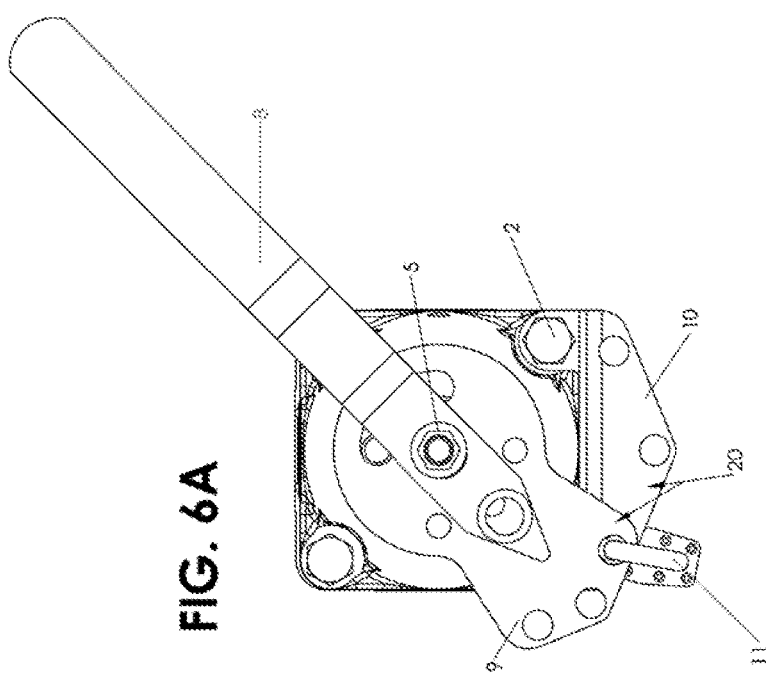

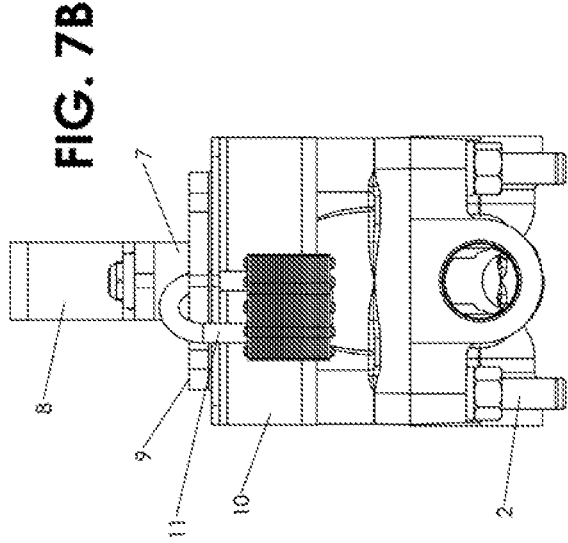
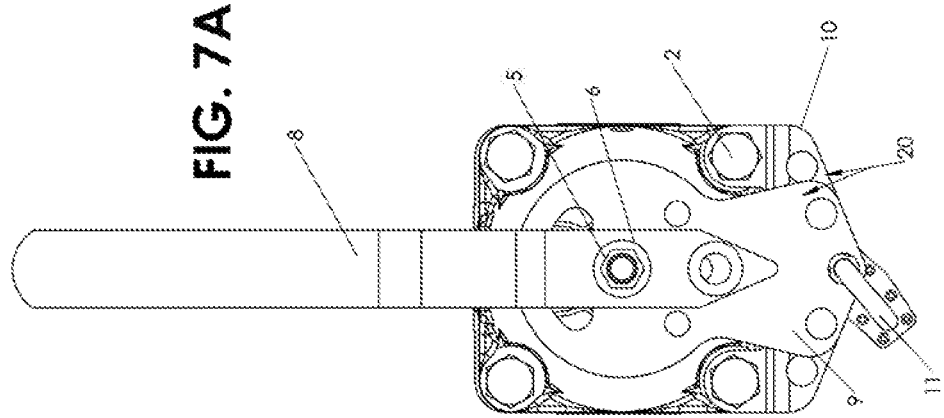

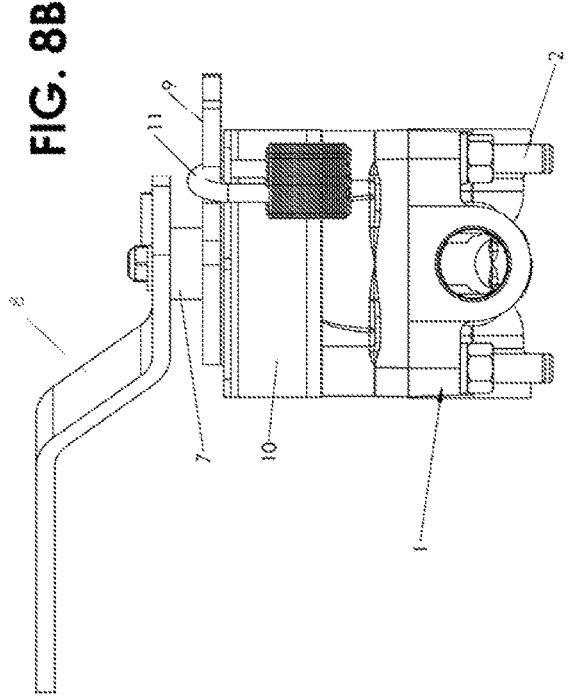
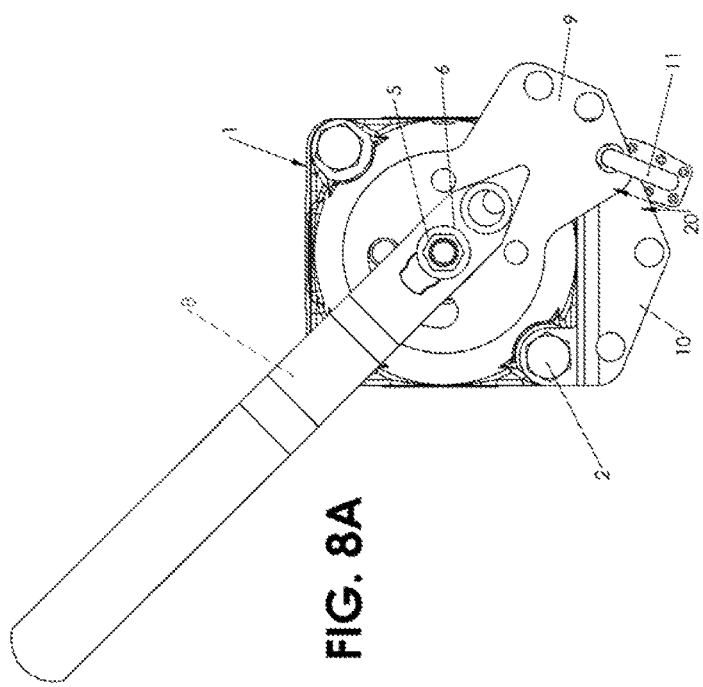

DIRECTIONAL CONTROL VALVE LOCKING DEVICE

BACKGROUND

The present invention relates to locking devices in general and more particularly to a locking device for directional control valves to protect against the intentional and/or unintentional adjustment of the valve handle from a desired position.

In typical directional control valve systems, whether liquid or gas, the selected operating position of the handle of the valve thereof may be essential to the proper operation and functioning of the system as a whole. The improper positioning of the handle or the intentional or unintentional adjustment of the valve handle may result in a complete malfunction of the system, often with serious and dangerous consequences. Accordingly, it is often desirable to securely lock directional control valves at one or more desired operating positions to prevent intentional tampering and unauthorized or otherwise inadvertent manipulation of the valve handle from the desired operating position.

Directional control valves are commonly used for general purpose and heavy-duty industrial applications. It is desirable to secure or lock valves in a desired operating position in nearly all applications. Unfortunately, tampering with industrial operations is often a great temptation to certain people, or organizations, by unauthorized manipulation of the valves to interrupt or interfere with industrial productions. Alternatively, unauthorized manipulation of valves can simply be the result of inadvertent misuse or accidental mistakes. Occupational health and safety organizations, such as the Occupational Safety and Health Administration (OSHA) and other workplace and industrial oversight organizations, advocate more control over the operation of directional control valves. The ability to securely lock directional control valves in the desired operating positions avoids many, if not all, of the described problems, which in turn avoids potential catastrophic and/or injurious conditions in industrial and other settings.

Many of the known valve locking devices are expensive, complex, difficult to manufacture and install, interfere with the normal operation of the valve, and require many parts in order to be adapted to a valve. Because of this, field personnel often improvise and hastily create a roughly constructed, makeshift mechanism to lock a valve in its desired position. The inadequacy of the makeshift mechanism often leads to unsafe conditions. For example, an extremely important safety procedure in many industries, the oil and gas industry for example, is the "lockout/tagout" procedure to ensure workers remain safe while servicing or repairing equipment by making it physically impossible to change the desired operating position. An effective locking device for valves during "lockout/tagout" is important to prevent unsafe conditions. Failure of having an adequate locking device could lead to property damage, serious injury or death.

For the foregoing reasons, there is a need for a relatively inexpensive yet secure, simple, effective and easily implemented locking device for valves which may be virtually universally adapted for mounting and operation on almost all conventional directional control valves for use in any number of applications and/or environments to prevent the unauthorized, inadvertent or otherwise undesired manipulation of directional control valves from a desired operating position.

SUMMARY

The present invention is directed to a locking device for directional control valves that satisfies the foregoing needs. The locking device according to this invention provides an economical and easily implemented solution for the secure locking of directional control valves in the desired operating position. Such a device according to this invention cannot be easily defeated, destroyed or otherwise removed without authorization. Therefore, the locking device of the present invention prevents the unauthorized, inadvertent or otherwise undesired manipulation of directional control valves from their desired operating position, thereby minimizing, if not entirely eliminating, the likelihood for damage or injury in an industrial or other setting.

A locking device having features of the present invention comprises an adjustable locking plate and a fixed locking bracket designed to be installed on directional control valves using the valve's existing parts for ease of installation and so as not to interfere with the normal operation of the valve. The adjustable locking plate of the present invention replaces the valve's existing ball detent travel stop plate. The adjustable locking plate retains the use of the valve's stem, stem bushing, lever handle, stem washer, and stem nut. The adjustable locking plate is installed on the existing stem of the valve underneath the stem bushing, which separates the adjustable locking plate from the control lever handle, and affixed to the valve by the stem washer and stem nut. The adjustable locking plate incorporates the features found on the valve's existing ball detent travel stop plate, which include the ball detent holes and travel stop hole. The ball detent holes in combination with the ball detents of the valve aid in the adjustment of the valve lever handle to the different operating positions. The travel stop hole also aids in this adjustment and limits the movement of the valve lever handle. Additionally, the adjustable locking plate has at least three spaced apart locking holes therein. The fixed locking bracket of the present invention consists of a mounting portion and locking portion. The mounting portion of the fixed locking bracket has at least two holes designed to be mounted to the valve using the valve's existing bolts, lock washers and nuts. The locking portion of the fixed locking bracket has at least 3 spaced apart locking holes. The locking holes of the adjustable locking plate and fixed locking bracket are spaced apart so that they align with each other depending on the position of the directional control valve's control lever handle. A lock or other locking means can then be inserted through the aligned locking holes of the adjustable locking plate and fixed locking bracket to securely lock the directional control valve in the desired position to prevent the unauthorized, inadvertent or otherwise undesired manipulation of the directional control valve, thereby increasing the security and safety of the directional control valve and systems utilizing them.

While it is to be understood that both the foregoing general description and the following detailed description are exemplary and explanatory only and are not restrictive on the present invention, these and other features, aspects, and advantages of the present invention will become better understood with regard to the following detailed description and accompanying drawings where:

BRIEF DESCRIPTION OF THE DRAWINGS

FIG. 1 is a perspective view of a directional control valve having the locking device of the present invention mounted thereon;

FIG. 2A is a top view of the adjustable locking plate of the present invention;

FIG. 2B is a front view of the adjustable locking plate shown in FIG. 2A;

FIG. 3A is a top view of the fixed locking bracket of the present invention;

FIG. 3B is a front view of the fixed locking bracket shown in FIG. 3A;

FIG. 3C is a side view of the fixed locking bracket shown in FIG. 3A;

FIG. 4A is a top view of a directional control valve having the locking device of the present invention mounted thereon showing the directional control valve locking device in a first position of operation of the lever handle;

FIG. 4B is a front view of the directional control valve and locking device of FIG. 4A;

FIG. 5 is a perspective view of the directional control valve having the locking device of the present invention mounted thereon in a locked position with a lock installed thereon, said position representing a second position of operation of the of the lever handle;

FIG. 6A is a top view of the directional control valve and locking device of FIG. 4A showing the locking device in a locked position with a lock installed thereon;

FIG. 6B is a front view of the directional control valve and locking device of FIG. 6A.

FIG. 7A is a top view of the directional control valve and locking device of FIG. 5.

FIG. 7B is a front view of the directional control valve and locking device of FIG. 7A.

FIG. 5A is a top view of a directional control valve having the locking device of the present invention mounted thereon in a locked position with a lock installed thereon, said position representing a third position of operation of the lever handle;

FIG. 8B is a front view of the directional control valve and locking device of FIG. 8A.

DESCRIPTION

Referring now to the drawings, reference will be made to the preferred embodiment of the invention, an example of which is illustrated in the accompanying drawings and not meant for purposes of limited the scope of the present invention. With reference to FIG. 1, it is generally shown a directional control valve 1 to which a locking device 20 of the present invention is installed thereon. Although the preferred embodiment has been developed for the directional control valve 1, it is shown for purposes of merely illustrating the present invention and it is within the scope of the present invention to adapt the locking device to any valve or other device controlled by an operating member or handle rotating between any number of controlled positions. However, as disclosed herein, the valve used with the preferred embodiment of the present invention comprises the directional control valve 1 having a stem 19 protruding outwardly from the valve body on which an adjustable locking plate 9 and a valve lever handle 8 are mounted. The adjustable locking plate 9 and a valve lever handle 8 are separated from each other by a stem bushing 7 and all affixed to the valve stem 19 by a stem washer 6 and a stem nut 5. In the preferred embodiment, the valve lever handle 8, stem bushing 7, stem washer 6 and stem nut 5 are existing components of the valve 1. A fixed locking bracket 10 is affixed to the valve body using existing bolts 2, lock washers 3, and nuts 4 of the valve.

The locking device 20 of the present invention is better illustrated in FIGS. 2A-3C and in, the preferred embodiment, is generally comprised of two, separate component parts, namely, the adjustable locking plate 9 and fixed locking bracket 10. The adjustable locking plate 9 has a stem slot 18 for receiving the stem 19 of the valve for mounting and installation and adopts the ball detent holes 21 and travel stop 22 that are part of original valve ball detent travel stop plate so that the adjustable locking plate 9 retains the use of the valve's ball detents and travel stop, thereby not interfering with the normal operation of the valve 1. Further, the adjustable locking plate 9 has locking holes 15, 16, and 17, each of which correspond to a different desired operating position of the valve wherein the valve may be securely locked in said position. The fixed locking bracket 10 is comprised of a mounting portion 25 and a locking portion 24, wherein the mounting portion 25 has two mounting holes 23 so that the fixed locking bracket can be affixed to the valve using the existing bolts 2, lock washers 3, and nuts 4 of the valve, and the locking portion has three locking holes 12, 13, and 14, each of which correspond to a different desired operating position of the valve and also align with the locking holes 15, 16, and 17 of the adjustable locking plate 9 at the desired operating positions. The locking portion 24 is in a plane generally higher than the plane of the mounting portion 25, that is the locking portion 24 is in a plane close to the top of the valve 1, while the mounting portion 25 is in a plane closer to the middle of the body of the valve 1. It is possible for alternative embodiments for use with other types of valves or apparatuses in difference environments to have more or less locking holes and to have them spaced differently than in the preferred embodiment. The adjustable locking plate 9 and fixed locking bracket 10 are preferably constructed from A36 carbon steel and yellow zinc plated, but of course can be made of other advantageous materials without departing from the intent or scope of the present invention.

As is shown in FIGS. 4A and 4B, when the valve lever handle 8 is in a first position of operation, locking hole 15 of the adjustable locking plate 9 is perfectly aligned above locking hole 14 of the fixed locking bracket 10. As is shown in FIGS. 6A and 6B, if the first position of operation of the lever handle is the desired position of the directional control valve 1, then a padlock 11, or other means of locking, can be passed through the aligned locking holes 15 and 14 so as to securely lock the valve in this desired operating position.

FIGS. 5, 7A and 78B show the directional control valve 1 locked in a second position of operation of the valve lever handle S. As is shown, when the directional control valve 1 is in the second position of operation, locking hole 16 of the adjustable locking plate 9 is perfectly aligned above locking hole 13 of the fixed locking bracket 10. A padlock 11, or other locking means, can then be passed through the aligned locking holes 13 and 16 so as to securely lock the directional control valve in this desired position.

As is shown in FIGS. 8A and 8B, when the valve lever handle 8 is in a third position of operation, locking hole 17 of the adjustable locking plate 9 is perfectly aligned above locking hole 12 of the fixed locking bracket 10. If the third position of operation of the valve lever handle 8 is the desired position of the valve 1, then a padlock 11, or similar means of locking, can be passed through the aligned holes 12 and 17 so as to securely lock the valve in this desired position.

While the locking device has been described with reference to a directional control valve, it will be appreciated that other valve types as well as other structures and apparatus having a rotatable operating member could also utilize the subject device. While some modifications to the subject locking device may be necessary for adapting to a specific valve or apparatus or operational environment, the above description of the preferred embodiment is deemed sufficient to permit those skilled in the art to practice the concepts of the present invention. Further, it is within the ambit of the present invention to cover any obvious modifications of the preferred embodiment described herein.

What is claimed is:

1. A locking device for securely locking a directional control valve in a desired operating position comprising:
   an adjustable locking plate comprising a planar plate member having a stem slot therein for receiving an existing valve stem and mounting the adjustable locking plate to said valve, and a plurality of locking holes therein; said adjustable locking plate moving coaxially with the stem of the valve to various operating positions;
   a fixed locking bracket comprising a mounting portion and a locking portion, said mounting portion having at least two mounting holes therein for receiving a plurality of existing valve bolts such that the fixed locking bracket is mounted to the valve, said locking portion having a plurality of locking holes, said locking holes of the fixed locking bracket adapted to be aligned with said locking holes of the adjustable locking plate at the various operating positions so that a locking means can be passed therethrough, securely locking the valve in the desired operating position;
   wherein the adjustable locking plate is mounted to the valve by receiving the valve's stem through the stem slot, followed by an existing stem bushing, an existing valve lever handle, an existing stem washer, and an existing stem nut of the valve;
   wherein the adjustable locking plate further comprises a plurality of ball detent holes and a travel stop hole to receive a plurality of corresponding components on the valve and be operably connected thereto.

2. A locking device for securely locking a directional control valve in a desired operating position comprising:
   an adjustable locking plate comprising a planar plate member having a stem slot therein for receiving the an existing valve stem and mounting the adjustable locking plate to said valve, a plurality of locking holes therein, and a plurality of ball detent holes and a travel stop hole to receive the plurality of corresponding components on the valve and be operably connected thereto; said adjustable locking plate moving coaxially with the stem of the valve to various operating positions;
   a fixed locking bracket comprising a mounting portion and a locking portion, said mounting portion having at least two mounting holes therein for receiving the a plurality of existing valve bolts such that the fixed locking bracket is mounted to the valve, said locking portion having a plurality of locking holes, said locking holes of said adjustable locking plate adapted to be aligned with said locking holes of the fixed locking bracket at the various operating positions so that a locking means can be passed therethrough, securely locking the valve in the desired operating position.

3. The locking device of claim 2, wherein the adjustable locking plate is mounted to the valve by receiving the valve's stem through the stem slot, followed by an existing stem bushing, an existing valve lever handle, an existing stem washer, and an existing stem nut of the valve.

4. The locking device of claim 2, wherein the specific number of the ball detent holes is dependent on the number of operating positions of the valve.

5. The locking device of claim 2, wherein the locking means is a padlock.

6. The locking device of claim 2, wherein the adjustable locking plate and fixed locking bracket are constructed from A36 carbon steel and yellow zinc plated.

7. The locking device of claim 2, wherein securely locking the valve in the desired operating position prevents the unauthorized, inadvertent or otherwise undesired manipulation of the valve from the desired operating position.

8. A locking device for securely locking a directional control valve in a desired operating position comprising:
   an adjustable locking plate comprising a planar plate member having a stem slot therein for receiving an existing valve stem and mounting the adjustable locking plate to said valve, at least three locking holes therein, at least 3 ball detent holes and a travel stop hole to receive a plurality of corresponding components on the valve and be operably connected thereto; said adjustable locking plate moving coaxially with the stem of the valve to a plurality of operating positions;
   a fixed locking bracket comprising a mounting portion and a locking portion, said mounting portion having at least two mounting holes therein for receiving a plurality of existing valve bolts such that the fixed locking bracket is mounted to the valve, said locking portion having at least three locking holes, said locking holes of said adjustable locking plate adapted to be aligned with said locking holes of the fixed locking bracket at the various operating positions so that a locking means can be passed therethrough, securely locking the valve in the desired operating position, thereby preventing the unauthorized, inadvertent or otherwise undesired manipulation of the valve from the desired operating position.

9. The locking device of claim 8, wherein the adjustable locking plate is mounted to the valve by receiving the valve's stem through the stem slot, and an existing stem bushing, an existing valve lever handle, an existing stem washer, and an existing stem nut of the valve are connected to the valve's stem thereafter.

10. The locking device of claim 8, wherein the specific number of the ball detent holes is dependent on the number of operating positions of the valve.

11. The locking device of claim 8, wherein the adjustable locking plate and fixed locking bracket are constructed from A36 carbon steel and yellow zinc plated.

* * * * *